Patented May 14, 1946

2,400,453

UNITED STATES PATENT OFFICE 2,400,453

CELLULOSE ACETATE BUTYRATE COATING COMPOSITIONS

Charles Bogin, Terre Haute, Ind., assignor to Commercial Solvents Corporation, Terre Haute, Ind., a corporation of Maryland No Drawing. Application October 23, 1943, Serial No. 507,460

9 Claims. (Cl. 106—184)

The present invention relates to cellulose acetate butyrate coating compositions. More particularly, it is concerned with coating compositions of this type which utilize, as diluents, mixtures of hydrocarbons and acetates of certain aliphatic alcohols.

Cellulose acetate butyrate is, at the present time, produced in two different grades, i. e., one having a high acetyl content and low butyryl content, and the other having a high butyryl figure but low in acetyl content. The former grade, however, is the one that I desire to utilize in practicing my invention, since the films formed therefrom are substantially more satisfactory with regard to hardness and abrasion, as well as in other respects. The preferred grade of cellulose acetate butyrate has an acetyl content ranging from about 28 to 33 per cent and a butyryl content of between 14 and 20 per cent. Coating compositions which contain cellulose acetate butyrate of the above preferred type, as their principal film-forming agent, have several distinct advantages over the nitrocellulose and cellulose acetate lacquers. For example, the cellulose acetate butyrate lacquers share with cellulose acetate the two most pronounced advantages which the latter possesses over nitrocellulose, i. e., low inflammability and resistance to ultra-violet light. On the other hand, cellulose acetate butyrate films are far superior to those of cellulose acetate in regard to moisture absorption, and are moderately superior in moisture permeability. Such characteristics are probably of chief importance in the case of airplane finishes where the high moisture absorption of cellulose acetate causes films thereof to lose a considerable proportion of their tautening powers in wet weather. This characteristic is also of some importance in finishes for polished metals where the reduced moisture permeability increases the protection against tarnishing and rusting. A further advantage of cellulose acetate butyrate coating compositions over the cellulose acetate lacquers, is their greater compatibility with plasticizers and resins such as those commonly used in nitrocellulose lacquers. A still further advantage of cellulose acetate butyrate over nitrocellulose, is the use of the former in bronzing lacquers. Lacquers of the latter type, which contain cellulose acetate butyrate, are free from the tendency of nitrocellulose compositions to gel and discolor in the presence of aluminum or copper bronze.

Although the formulation of cellulose derivative lacquers, such as those containing nitrolcellulose, no longer presents much of a problem, the preparation of a satisfactory coating composition having cellulose acetate butyrate as the chief film-forming agent, still offers considerable difficulty. In addition to the fact that there are relatively few solvents or solvent mixtures capable of forming satisfactory solutions with cellulose acetate butyrate, there exists the further disadvantage that such solutions have a relatively low tolerance for the ordinary cheap diluents, which tends to make such compositions less competitive with the nitrocellulose lacquers, in spite of the above-mentioned advantages possessed by cellulose acetate butyrate films. It is therefore an object of my invention to provide cheap diluent mixtures for which solutions of cellulose acetate butyrate have a high tolerance, and to thereby furnish the art with cellulose acetate butyrate coating compositions that are economically competitive with the nitrocellulose lacquers. Further objects and advantages of my invention will be apparent from the description which follows.

I have discovered that solutions of cellulose acetate butyrate, prepared from any of the common solvents therefor, such as, for example, the lower nitroparaffins, ethyl acetate, diacetone alcohol, etc., possess an extremely high tolerance for diluent mixtures consisting of a hydrocarbon and the acetates of certain aliphatic alcohols. Cellulose acetate butyrate lacquers containing the diluent mixtures of the present invention, and in the proportions prescribed herein, possess many advantages over the previously-used diluent mixtures of aliphatic alcohols and hydrocarbons, or mixtures similar thereto. For example, I have found that cellulose acetate butyrate solutions which utilize diluent mixtures consisting of a hydrocarbon and an acetate of an aliphatic alcohol having three or more carbon atoms, are far superior to cellulose acetate butyrate solutions containing the alcohol-hydrocarbon diluent mixtures formerly employed with respect to stability, especially when in contact with metal surfaces at moderately elevated temperatures, and blushing of the films produced therefrom. Thus, a solution of cellulose acetate butyrate, containing butanol and ethanol, corrodes steel very noticeably at temperatures above 50° C., and rapidly increases in viscosity when subjected to such conditions. Cellulose acetate butyrate solutions containing the diluent mixtures of the present invention, however, are free from these defects.

The quantity of diluent mixture utilized will, in general, vary with the particular grade of cellulose acetate butyrate employed, as well as the solvent used. Ordinarily, I have found that large volumes of diluents of the above-mentioned type can be tolerated by solutions of cellulose acetate butyrate dissolved in a nitroparaffin such as, for example, nitropropane. It has likewise been my observation that solutions of said cellulose acetate butyrate prepared by dissolving the latter in certain solvents therefor, such as diacetone alcohol or ethyl acetate, have an especially higher tolerance for my new diluent mixtures than for the diluents and diluent mixtures formerly used. Also such compositions exhibit a marked tendency to remain in a stable condition when stored for extended periods of time.

Still another factor upon which the tolerance of such cellulose acetate butyrate solutions depends, is the composition of the diluent mixture. Generally, the acetate component may comprise from about 30 to about 70 per cent of the total diluent mixture, while the proportion of diluents in the solvent mixture may vary from between about 30 and 75%. Ordinarily, however, I prefer to utilize a diluent mixture that consists of about 50 per cent acetate. Utilizing mixtures of the latter composition, I have procured highly satisfactory cellulose acetate butyrate coating compositions containing as much as 75 per cent diluents, and as little as 25 per cent solvents. In order to obtain cellulose acetate butyrate solutions of this type, it is necessary to first prepare a stock solution which contains at least twice the concentration of cellulose acetate butyrate as is desired in the final composition. Such stocks are prepared by dissolving the cellulose acetate butyrate in a concentration of 12 to 14 grams for each 100 cc. of a solvent mixture which contains over 50 per cent true solvent for the cellulose acetate butyrate. When solution of the later is complete, a second solvent mixture, which preferably consists of about 90 per cent diluents, is added, with agitation and frequently with heating. The resulting composition is capable of producing a clear, water-resistant and durable film.

As mentioned above, the acetates which I may utilize in my diluent mixtures, are those produced from alcohols having three or more carbon atoms. For the majority of instances, however, I have found it preferable to employ the acetates of alcohols having from three to five carbon atoms. Examples of suitable acetates are propyl acetate, butyl acetate, amyl acetate, hexyl acetate, heptyl acetate, and the like. In any particular case, it will be found that the choice of the acetate used will be governed to some extent, at least, by the character of the remaining components of the solvent mixture, as well as the rate of evaporation desired. Also, in order to obtain a clear film of cellulose acetate butyrate, it will generally be necessary to employ an acetate which evaporates at least as fast as the principal solvent utilized, in order that the cellulose acetate butyrate will remain in solution throughout the evaporation of the solvent mixture. Combinations of one or more of the preferred acetates, however, may be found desirable in this respect, as well as from other standpoints.

As examples of suitable hydrocarbon diluents, there may be mentioned xylene, toluene or high-solvency naphtha. Generally, naphtha or toluene will be found suitable for most purposes. The quantity of such materials to be employed will likewise depend on the other components of the solvent mixture, as well as the composition of the particular grade of cellulose acetate butyrate utilized. Thus, for any particular cellulose acetate butyrate solutions, there will be a specific tolerance range for the diluent mixture used, the tolerance tending to decrease with an increase in the carbon content of the solvents employed.

The following examples are given in order to illustrate more particularly the diluent mixtures provided by the present invention:

Example I

A stock solution of cellulose acetate butyrate having an acetyl content of 29.5 per cent and a butyryl content of 15 per cent, was prepared by dissolving 12 parts of cellulose acetate butyrate in 100 parts of a solvent mixture consistsing of 20 per cent 1-nitropropane, 15 per cent diacetone alcohol, 30 per cent ethyl acetate, 20 per cent butyl acetate and 15 per cent high-solvency naphtha. To the resultant solution was next added 100 parts of a mixture consisting of 10 per cent ethyl acetate, 43 per cent butyl acetate and 47 per cent high-solvency naphtha. The solution thus produced was perfectly clear, and when flowed on a glass surface, deposited a clear film of cellulose acetate butyrate which was highly resistant to blushing.

Example II

A clear solution of cellulose acetate butyrate was prepared by dissolving 14 parts of cellulose acetate having an acetyl content of 30 per cent, and a butyryl content of 19 per cent, in 100 parts of a solvent mixture consisting of 20 per cent 1-nitropropane, 15 per cent diacetone alcohol, 20 per cent ethyl acetate, 30 per cent butyl acetate and 15 per cent high-solvency naphtha. To this stock solution was then added 100 parts of a mixture consisting of 30 per cent amyl acetate, 10 per cent diacetone alcohol, 20 per cent methyl ethyl ketone, and 40 per cent of high-solvency naphtha, the addition of the second solvent mixture being accompanied by vigorous stirring. The resulting solution was perfectly clear, and possessed a viscosity suitable for application by brush or spray gun.

Example III

A stock solution of cellulose acetate butyrate having an acetyl content of 30 per cent and a butyryl content of 20 per cent, was prepared by dissolving 12 parts thereof in 100 parts of a solvent mixture consisting of 15 per cent 1-nitropropane, 20 per cent diacetone alcohol, 30 per cent ethyl acetate, 20 per cent propyl acetate and 15 per cent toluene. After solution was effected by the aid of agitation and heat, 100 parts of a second solvent mixture was added, which consisted of 10 per cent ethyl acetate, 43 per cent propyl acetate and 47 per cent toluene. The resulting solution of cellulose acetate butyrate was perfectly clear, and when flowed on a glass surface, deposited a clear film of cellulose acetate butyrate, which was resistant to blushing.

In order to further demonstrate the comparatively high tolerance of cellulose acetate butyrate solutions for the diluent mixtures of the present invention, as compared with the tolerance of such solutions for previously-used diluent mixtures, the following table is included:

Table

| Composition of diluent mixture | Tolerance of 20% solution in 1-nitropropane | Tolerance of 20% solution in ethyl acetate | Tolerance of 15% solution in diacetone alcohol |
| --- | --- | --- | --- |
| 30-70 butyl acetate-toluene | 5.0 | <1 | 4.0 |
| 50-50 butyl acetate-toluene | >15.0 | >11.0 | >10.0 |
| 30-70 butyl alcohol-toluene | 12.0 | <1.0 | <1.0 |
| 50-50 butyl alcohol-toluene | 8.0 | <1.0 | <1.0 |
| 30-70 butyl acetate-high-solvency naphtha | 1.5 | <1.0 | 1.0 |
| 50-50 butyl acetate-high-solvency naphtha | 6.4 | >14.0 | 4.0 |
| 70-30 butyl acetate-high-solvency naphtha | >15.0 | | |
| 30-70 butyl alcohol-high solvency naphtha | 6.6 | <1.0 | <1.0 |
| 50-50 butyl alcohol-high solvency naphtha | 5.8 | <1.0 | <1.0 |
| 50-50 butyl acetate-aliphatic naphtha | <1.0 | | |
| 70-30 butyl acetate-aliphatic naphtha | 6.5 | | |
| 30-70 butyl alcohol-aliphatic naphtha | 2.0 | | |
| 50-50 butyl alcohol-aliphatic naphtha | 2.1 | | |
| Butanol | 2.2 | <1.0 | <1.0 |
| Toluene | 2.5 | <1.0 | <1.0 |

The above examples, as well as the data included in the foregoing table, are to be construed as merely illustrative of the comparatively high tolerance of cellulose acetate butyrate solutions in general, for the diluent mixtures of my invention. Therefore, such examples should not be considered at all limitative. For instance, it will readily occur to one skilled in the art that the specific compositions disclosed above are subject to numerous modifications, both with respect to the composition of the true solvent mixture and the diluent mixture. Consequently, it is to be understood that the use of any such modifications or equivalents, that would naturally occur to one skilled in the art, lie within the scope of my invention.

My invention now having been described, what I claim is:

1. An improved coating composition comprising cellulose acetate butyrate having an acetyl content of from about 28 to about 33 per cent, and a butyryl content of from about 14 to 20 per cent, dissolved in a solvent thereof free from monohydric alipatic alcohols, and containing from approximately 30 per cent to approximately 75 per cent of a diluent mixture which consists essentially of a common hydrocarbon diluent and an acetate of a lower aliphatic monohydric alcohol having in excess of two carbon atoms, the latter constituting from between about 30 and 70% of the diluent mixture, the utilization of said diluent mixture resulting in the procurement of a stable coating composition having a reduced tendency to corrode metal surfaces at elevated temperatures, and capable of producing clear durable films that are highly resistant to blushing and abrasion.

2. An improved coating composition comprising cellulose acetate butyrate having an acetyl content of between 28 and 33 per cent, and a butyryl content of between 14 and 20 per cent, dissolved in a solvent therefor free from monohydric aliphatic alcohols, and containing between 30 per cent and 75 per cent of a diluent mixture consisting of approximately 50 per cent of a common hydrocarbon diluent and about 50 per cent of an acetate of a lower aliphatic monohydric alcohol having in excess of two carbon atoms, the latter constituting from between about 30 and 70% of the diluent mixture the utilization of said diluent mixture resulting in the procurement of a stable coating composition having a reduced tendency to corrode metal surfaces at elevated temperatures, and capable of producing clear durable films that are highly resistant to blushing and abrasion.

3. An improved coating composition comprising cellulose acetate butyrate having an acetyl content of between 28 and 33 per cent, and a butyryl content of between 14 and 20 per cent, dissolved in a solvent therefor free from monohydric aliphatic alcohols and containing between about 30 per cent to about 75 per cent of a diluent mixture consisting of high-solvency naphtha and butyl acetate, the utilization of said diluent mixture resulting in the procurement of a stable coating composition having a reduced tendency to corrode metal surfaces at elevated temperatures, and capable of producing clear durable films that are highly resistant to blushing and abrasion.

4. The composition of claim 3, in which the diluent mixture consists of butyl acetate and toluene.

5. The composition of claim 3, in which the diluent mixture consists of amyl acetate and high-solvency naphtha.

6. An improved coating composition comprising cellulose acetate butyrate having an acetyl content of between 28 and 33 per cent, and a butyryl content of between 14 and 20 per cent, dissolved in a solvent mixture free from monohydric aliphatic alcohols and comprising a major proportion of ethyl acetate and a minor proportion of nitropropane and diacetone alcohol, and containing from approximately 30 per cent to approximately 75 per cent of a diluent mixture, which consists essentially of a common hydrocarbon diluent and an acetate of a lower aliphatic monohydric alcohol having in excess of two carbon atoms, the latter constituting from between about 30 and 70% of the diluent mixture the utilization of said diluent mixture resulting in the procurement of a stable coating composition having a reduced tendency to corrode metal surfaces at elevated temperatures, and capable of producing clear durable films that are highly resistant to blushing and abrasion.

7. The coating composition of claim 1, in which the solvent for the cellulose acetate butyrate comprises a nitropropane.

8. The coating composition of claim 1, in which the solvent for the cellulose acetate butyrate consists essentially of ethyl acetate and diacetone alcohol.

9. The coating composition of claim 1, in which the solvent for the cellulose acetate butyrate comprises diacetone alcohol and methyl ethyl ketone.

CHARLES BOGIN.